(12) United States Patent
Suzuki et al.

(10) Patent No.: US 12,263,887 B2
(45) Date of Patent: Apr. 1, 2025

(54) VEHICLE REAR-SIDE STRUCTURE

(71) Applicant: SUBARU CORPORATION, Tokyo (JP)

(72) Inventors: Ryuya Suzuki, Tokyo (JP); Takashi Hashimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 318 days.

(21) Appl. No.: 17/973,114

(22) Filed: Oct. 25, 2022

(65) Prior Publication Data
US 2023/0143278 A1 May 11, 2023

(30) Foreign Application Priority Data
Nov. 5, 2021 (JP) ................. 2021-181113

(51) Int. Cl.
*B62D 21/15* (2006.01)
*B60K 1/04* (2019.01)
*B60L 50/60* (2019.01)
*B62D 21/17* (2006.01)

(52) U.S. Cl.
CPC .............. *B62D 21/155* (2013.01); *B60K 1/04* (2013.01); *B60L 50/66* (2019.02); *B62D 21/17* (2013.01); *B60K 2001/0416* (2013.01)

(58) Field of Classification Search
CPC . H01M 10/625; B62D 21/152; B62D 21/155; B60K 2001/0416; B60K 1/04; B60K 1/045
See application file for complete search history.

(56) References Cited

U.S. PATENT DOCUMENTS 8,881,853 B2 * 11/2014 Nitawaki ................ B60L 50/66
180/68.5
8,893,839 B2 * 11/2014 Saeki ................ H01M 10/6566
180/68.5
9,873,456 B2 * 1/2018 Hara ........................ B60K 1/04

FOREIGN PATENT DOCUMENTS

JP 2008-183959 A 8/2008
JP 2013-089448 A 5/2013

* cited by examiner

*Primary Examiner* — Joseph D. Pape
(74) *Attorney, Agent, or Firm* — McGinn IP Law Group, PLLC (57) ABSTRACT

A vehicle rear-side structure is configured to ease an impact applied onto a battery pack of a vehicle upon an occurrence of a collision. The vehicle rear-side structure includes side frames and a rear-end-collision impact reducer. The side frames extend in a front-rear direction of the vehicle and are disposed at positions at which the side frames sandwich the battery pack therebetween in a widthwise direction of the vehicle. The rear-end-collision impact reducer is disposed between and above the side frames at a rear side of the battery pack. The rear-end-collision impact reducer is configured to allow air, which is to be sent to a battery stack included in the battery pack, to flow through the rear-end-collision impact reducer.

16 Claims, 8 Drawing Sheets

VEHICLE REAR-SIDE STRUCTURE

CROSS-REFERENCE TO RELATED APPLICATIONS

The present application claims priority from Japanese Patent Application No. 2021-181113 filed on Nov. 5, 2021, the entire contents of which are hereby incorporated by reference.

BACKGROUND

The disclosure relates to a vehicle rear-side structure.

To drive a motor for supplying driving force to a vehicle, a large-capacity vehicle battery, which supplies electric power to a motor, is loaded in an electric automobile or a hybrid electric automobile. This vehicle battery is heavy and large to secure a sufficient continuous driving distance, so that it is disposed under a seat or under a rear floor, for example.

Japanese Unexamined Patent Application Publication (JP-A) No. 2013-89448 discloses a battery module that can be protected from the impact of a vehicle accident, such as a collision. The battery module includes a lower frame body for fixing the battery module. The lower frame body includes a front frame, a rear frame, and side frames. The front frame and the side frames each have a fastening flange, and the fastening flanges are partially superimposed on each other and can be fixed together to the vehicle. This structure can enhance the effect of protecting the battery module.

JP-A No. 2008-183959 discloses an air-conditioning structure using a crossmember as an air channel. In this structure, the crossmember is disposed between roof side rails of a roof frame forming a body, and an air-conditioning warm air channel and an air-conditioning cool air channel are formed in the crossmember.

SUMMARY

An aspect of the disclosure provides a vehicle rear-side structure configured to ease an impact applied onto a battery pack of a vehicle upon an occurrence of a collision. The vehicle rear-side structure includes side frames and a rear-end-collision impact reducer. The side frames extend in a front-rear direction of the vehicle and are disposed at positions at which the side frames sandwich the battery pack therebetween in a widthwise direction of the vehicle. The rear-end-collision impact reducer is disposed between and above the side frames at a rear side of the battery pack. The rear-end-collision impact reducer is configured to allow air, which is to be sent to a battery stack included in the battery pack, to flow through the rear-end-collision impact reducer.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

The technologies disclosed in the above-described publications still have room for improvement to effectively protect a battery module from the impact of a collision.

In the technology disclosed in JP-A No. 2013-89448, although the battery module is protected by the frames provided in the vehicle, using many frames enlarges the structure for protecting the battery module. This may increase the weight of the vehicle body and the complexity of the body structure and also raise the cost.

JP-A No. 2008-183959 describes that a member of a vehicle, such as a crossmember, is used to support the vehicle and is also used as an air channel, but it does not discuss the use of the crossmember to protect a battery module.

It is thus desirable to provide a vehicle rear-side structure including a member that can protect a battery stack loaded in a vehicle and can also be used as an air channel.

A vehicle 11 including a vehicle rear-side structure 20 according to an embodiment of the disclosure will now be described below in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In the following description, front, rear, top, bottom, left, and right directions are used. Left and right are those when the vehicle 11 is seen from the rear side.

Figure 1:
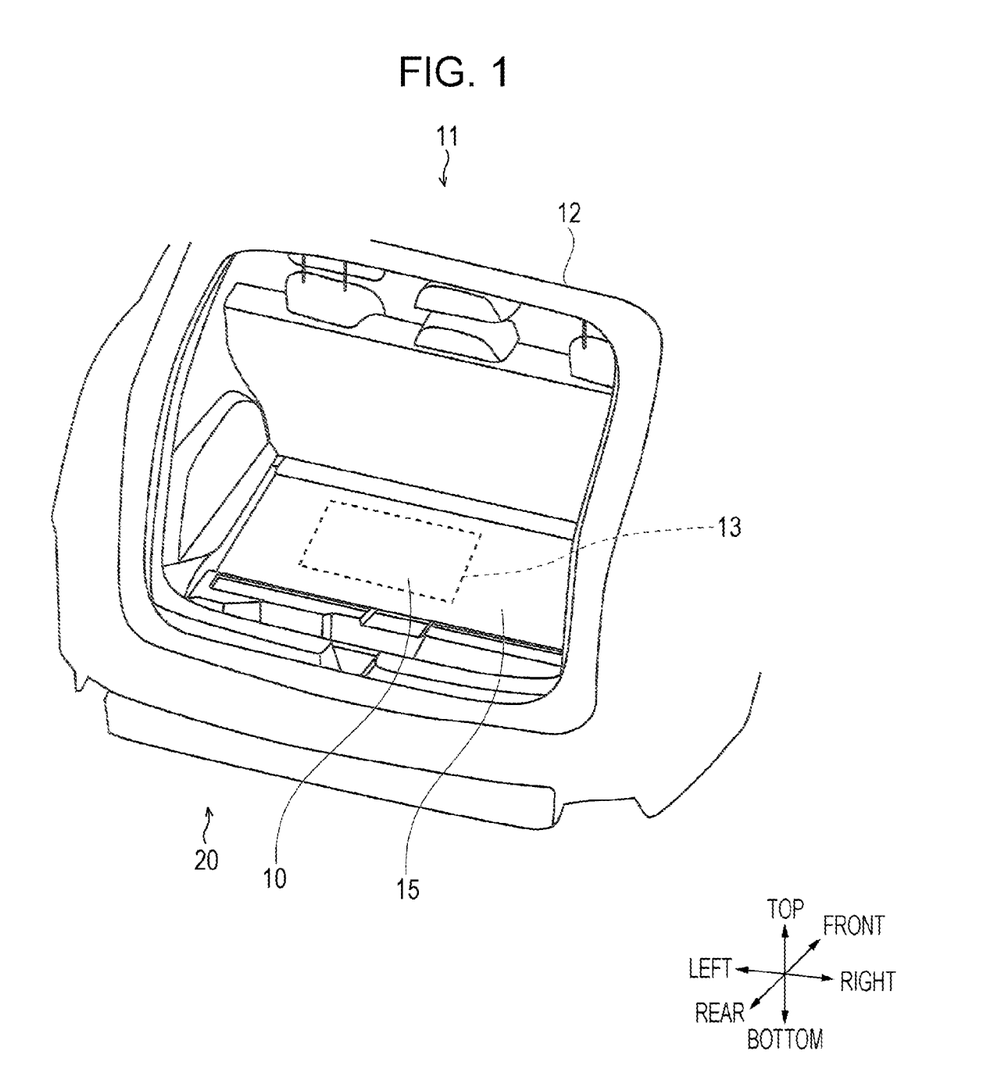
FIG. 1 is a perspective view of a vehicle including a vehicle rear-side structure according to an embodiment of the disclosure.

FIG. 1 is a perspective view of the vehicle 11 including the vehicle rear-side structure 20.

The vehicle 11 is an automobile or a train, for example. A battery pack 10 having a high storage capacity is loaded in the vehicle 11 to supply electric power to a motor and various other electrical components mounted in a body 12.

Examples of the vehicle 11 are an electric vehicle (EV), a hybrid electric vehicle (HEV), and a plug-in hybrid electric vehicle (PHEV).

The battery pack 10 is disposed in a storage space 13 formed under a rear floor 15.

The vehicle rear-side structure 20 is used to ease the impact of a collision on the battery pack 10 and is disposed to substantially surround the battery pack 10. The structure and other features of the vehicle rear-side structure 20 will be discussed later by mainly referring to FIGS. 3A and 3B.

Figure 2:
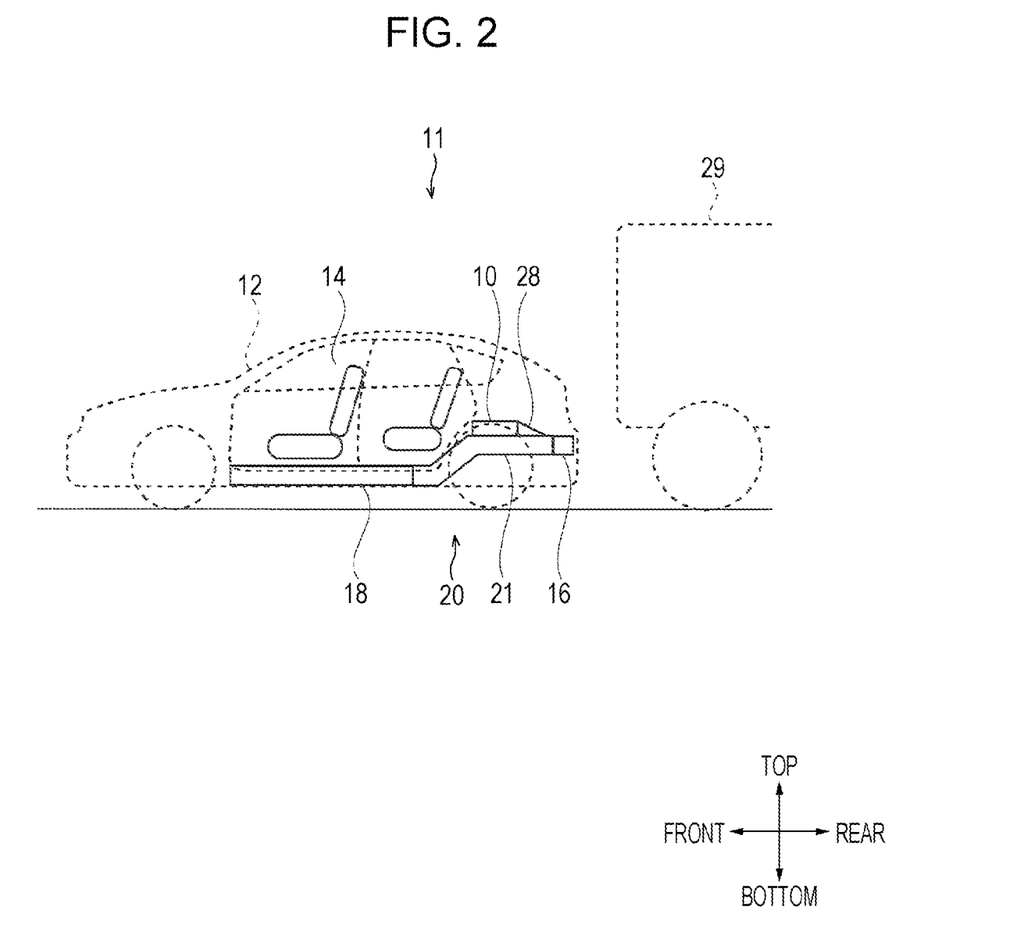
FIG. 2 is a side sectional view of the vehicle including the vehicle rear-side structure according to the embodiment.

FIG. 2 is a side sectional view of the vehicle 11 including the vehicle rear-side structure 20.

The body 12 of the vehicle 11 includes a frame 18. The frame 18 is disposed near the bottom of the body 12 and continuously extends from the front side to the rear side of the body 12. The frame 18 is provided on each of the left and right sides of the body 12. The rear side of the frame 18 serves as a side frame 21. A rear frame 16 is disposed near the rear end of each side frame 21 and extends in the widthwise direction of the vehicle 11. The upper end (surface) of the battery pack 10 is located at a higher position than the upper end (surface) of the side frames 21. This will be discussed later.

The vehicle rear-side structure 20 includes the side frames 21 and a rear-end-collision impact reducer 28.

The rear-end-collision impact reducer 28 is disposed at the rear side of the battery pack 10. The rear-end-collision impact reducer 28 has a function of easing the impact of a rear-end collision. Details of the rear-end-collision impact reducer 28 will be discussed later by mainly referring to FIGS. 5A and 5B.

A rear-end collision is an accident where a vehicle, such as a large vehicle 29 illustrated in FIG. 2, hits the vehicle 11 from behind. If the bottom end of the body of the large vehicle 29 is located at a higher position than the top surface of the side frame 21, an override collision may occur. Upon the occurrence of an override collision, the battery pack 10 of the vehicle 11 may be seriously influenced by the impact of the collision. In the embodiment, the rear-end-collision impact reducer 28 is provided in the vehicle 11 to protect the battery pack 10 from an override collision. This will be discussed later.

Figure 3A:
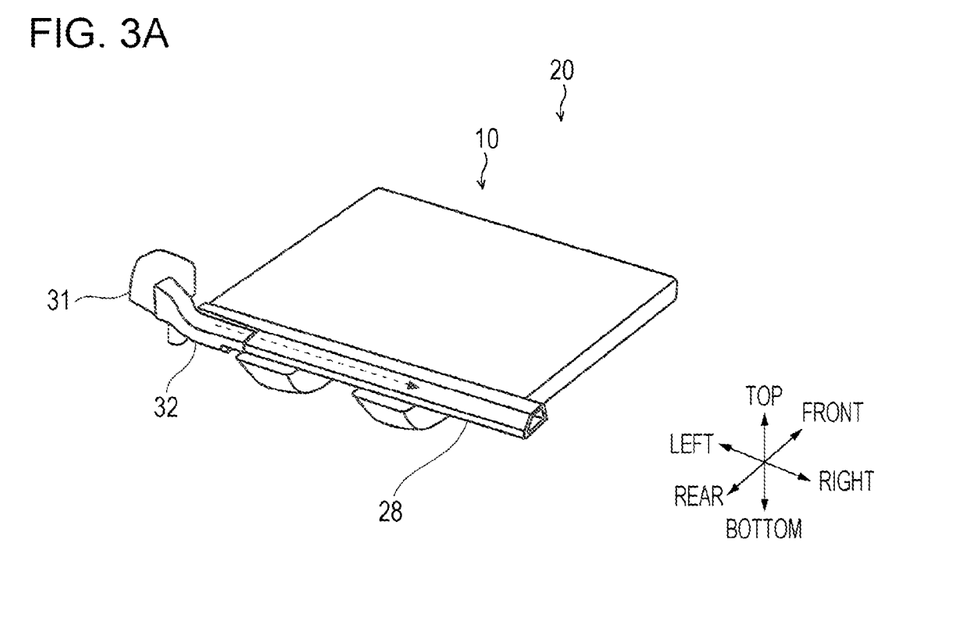
FIG. 3A is a perspective view of the vehicle rear-side structure according to the embodiment.
Figure 3B:
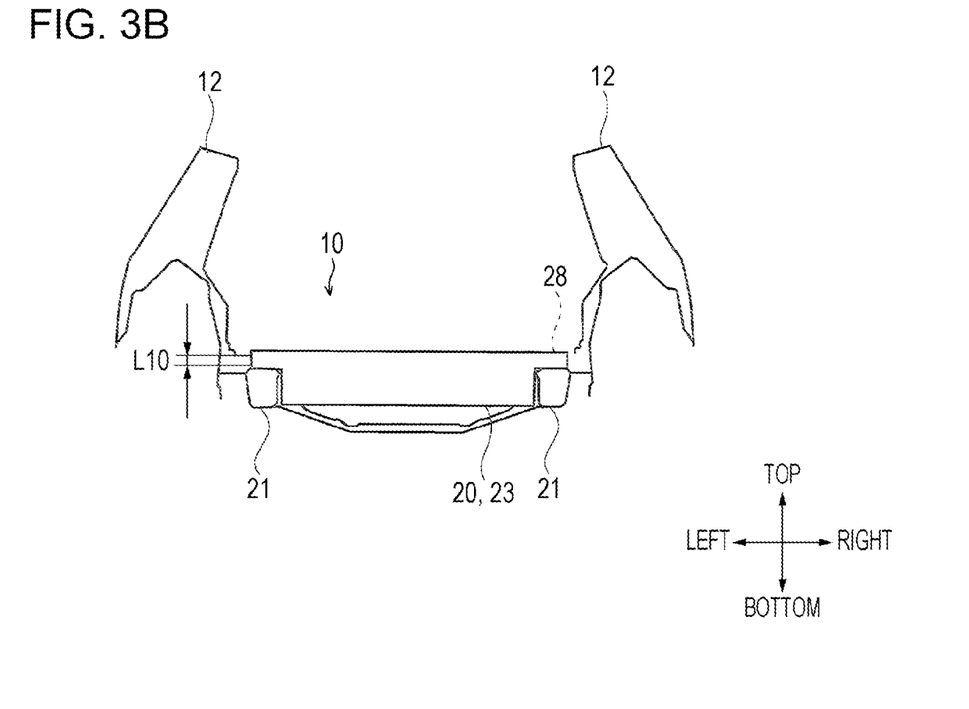
FIG. 3B is a rear view of the vehicle rear-side structure according to the embodiment.

FIG. 3A is a perspective view of the vehicle rear-side structure 20. FIG. 3B is a rear view of the vehicle rear-side structure 20.

As illustrated in FIG. 3A, the rear-end-collision impact reducer 28 is disposed at the rear side of the battery pack 10. The rear-end-collision impact reducer 28 is a substantially hollow member extending in the left-right direction and is an extrusion-molded aluminum member. Air, which is to be sent to a battery stack included in the battery pack 10, flows through the rear-end-collision impact reducer 28. This structure will be discussed later.

The battery pack 10 is a module having a built-in battery stack 23, which will be explained later. The configuration of the battery pack 10 will be discussed later by mainly referring to FIG. 5A.

A blower 31 and an inlet duct 32 are coupled to the left end of the rear-end-collision impact reducer 28.

The blower 31 contains a motor and a fan to send air. The blower 31 is coupled to the left end of the inlet duct 32.

The left end of the inlet duct 32 is coupled to the blower 31, while the right end thereof is coupled to the rear-end-collision impact reducer 28. The right end of the rear-end-collision impact reducer 28 may be closed to enhance the airtightness.

Air from a compartment 14 of the vehicle 11 is sent to the battery stack 23 contained in the battery pack 10 via the blower 31, the inlet duct 32, and the rear-end-collision impact reducer 28. With this structure, the battery stack 23 is cooled to be at a preset temperature range. An air channel formed from the rear-end-collision impact reducer 28 to the battery pack 10 will be explained later by mainly referring to FIG. 6A.

As illustrated in FIG. 3B, the side frame 21 is provided at each of the left and right sides of the body 12. The rear-end-collision impact reducer 28 is provided between the side frames 21 next to the battery pack 10 and is disposed at the rear side of the battery pack 10. The rear-end-collision impact reducer 28 is also located above the side frames 21. The left and right sides of the rear-end-collision impact reducer 28 are bonded to the top surfaces of the side frames 21 by welding or fastening.

The top surface of the battery pack 10 is located at a higher position than the top surfaces of the side frames 21. In one example, a length L10 (see FIG. 3B) between the top surface of the battery pack 10 and that of the side frame 21 is about 6 cm. With this configuration, in the case of the occurrence of the above-described override collision, the vehicle rear-side structure 20 may be seriously influenced by the impact of the collision. In the embodiment, however, the rear-end-collision impact reducer 28 is disposed at the rear side of the battery pack 10 and is located above the side frames 21. This structure can protect the battery pack 10 from a rear-end collision, which will be discussed later.

Figure 4:
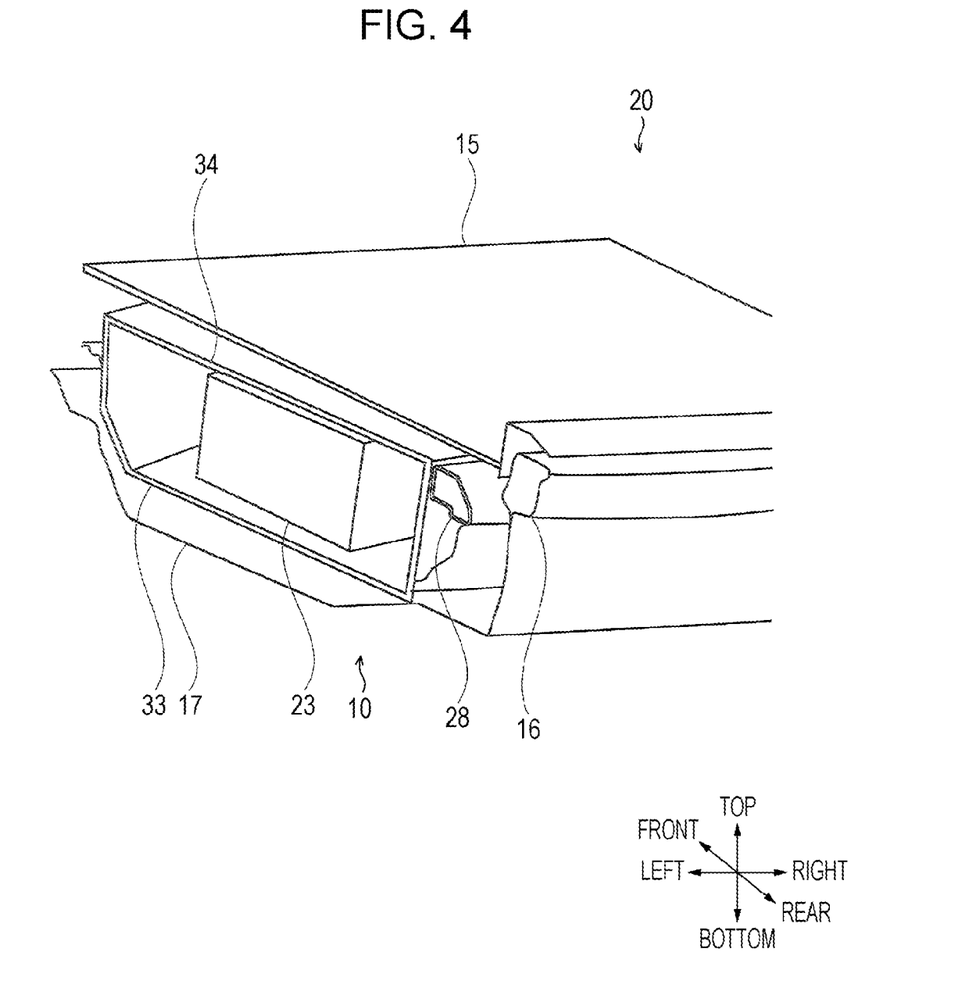
FIG. 4 is a cutaway perspective view of the vehicle rear-side structure according to the embodiment.

FIG. 4 is a cutaway perspective view of the vehicle rear-side structure 20.

In the vehicle rear-side structure 20, the battery pack 10 is disposed in a region covered by the rear floor 15 and a vehicle floor 17.

In one example, multiple battery stacks 23 are contained in the battery pack 10.

Each battery stack 23 is constituted by multiple battery cells coupled to each other. The battery cells are secondary cells, such as nickel-metal hydride batteries or lithium-ion batteries. The battery cells each have a rectangular flat shape, for example, and are arranged along the longitudinal direction, that is, the left-right direction, of the battery stack 23. The battery cells are arranged at substantially equal intervals with a gap therebetween.

The battery pack 10 includes a battery case 33 and a battery cover 34. The battery case 33 is a container-like member with a top surface opened. The battery cover 34 is a plate-like member which closes the opened top surface of the battery case 33 from above. Components such as the battery stacks 23 are stored in a space substantially sealed by the battery case 33 and the battery cover 34.

Figure 5A:
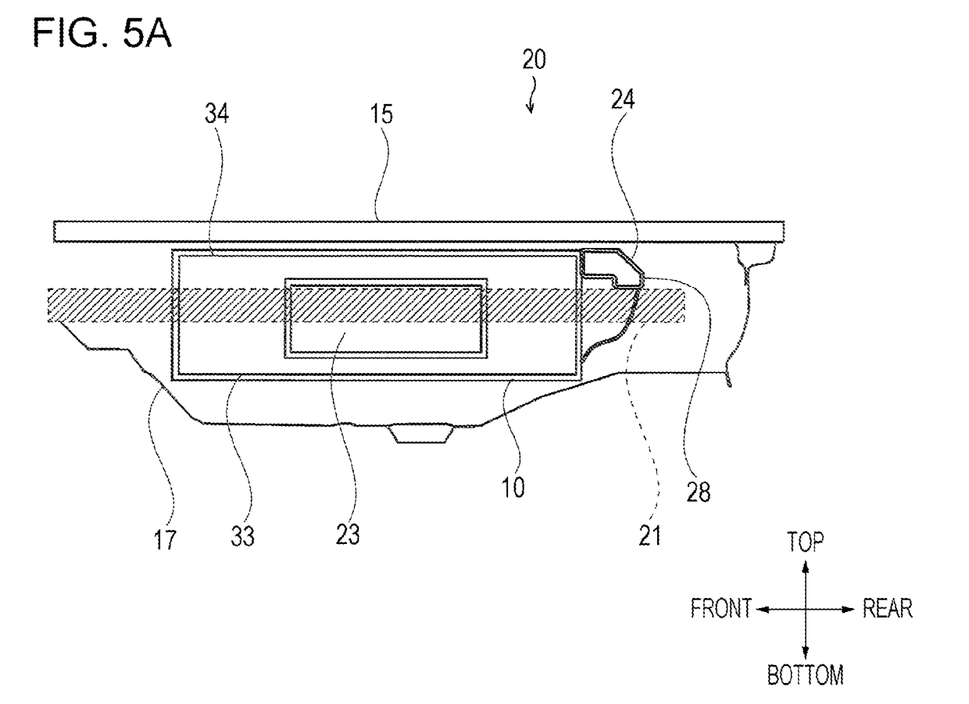
FIG. 5A is a side sectional view of the vehicle rear-side structure according to the embodiment.
Figure 5B:
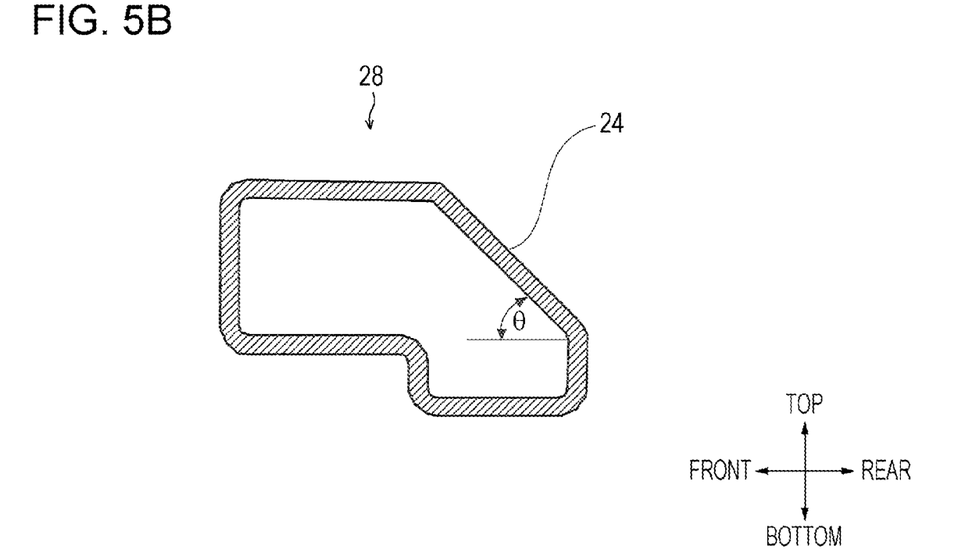
FIG. 5B is an enlarged side sectional view of a rear-end-collision impact reducer of the vehicle rear-side structure according to the embodiment.

FIG. 5A is a side sectional view of the vehicle rear-side structure 20. FIG. 5B is an enlarged side sectional view of the rear-end-collision impact reducer 28.

As illustrated in FIG. 5A, the rear-end-collision impact reducer 28 is disposed at the rear side of the battery pack 10. The upper end (surface) of the rear-end-collision impact reducer 28 is located at a higher position than that of the battery pack 10. Additionally, the upper end (surface) of the rear-end-collision impact reducer 28 is located at a higher position than that of the battery stack 23. With this configuration, in the case of the occurrence of the above-described override collision, the battery pack 10 and the battery stack 23 can be protected from the override collision. This will be discussed later.

A tilt surface 24 is formed on the rear-end-collision impact reducer 28. The top end of the tilt surface 24 is located at a position equivalent to or higher than the rear end of the top surface of the battery cover 34 of the battery 10. With this configuration, in the case of the occurrence of an override collision with another vehicle, such as the large vehicle 29 illustrated in FIG. 2, the rear-end-collision impact reducer 28 can divert the large vehicle 29 toward the upward direction, thereby effectively protecting the battery stack 23 from the override collision. Additionally, as stated above, the rear-end-collision impact reducer 28 is not a member formed by bend-molding a steel strip, but is an extrusion-molded aluminum member. Hence, the rear-end-collision impact reducer 28 has a high mechanical strength. This can also effectively protect the battery stack 23 from the override collision. The upper end (surface) of the rear-end-collision impact reducer 28 is located at a higher position than the upper end (surface) of the side frames 21. This can shift the impact of a rear-end collision toward the upward direction, thereby effectively protecting the battery stack 23 from the override collision.

As illustrated in FIG. 5B, the tilt surface 24 is formed at the upper rear side of the rear-end-collision impact reducer 28. The tilt surface 24 is tilted upward toward the front side. With this configuration, upon the occurrence of an override collision with the large vehicle 29, it is possible to shift the large vehicle 29 along the top surface of the battery cover 34, thereby effectively protecting the battery stack 23 from the override collision.

The angle θ of the tilt surface 24 with respect to the horizontal surface is preferably 45 degrees or smaller, and more preferably, 30 degrees or smaller. Setting the angle θ to this range can enhance the effect of the rear-end-collision impact reducer 28 protecting the battery stack 23 from an override collision.

Figure 6A:
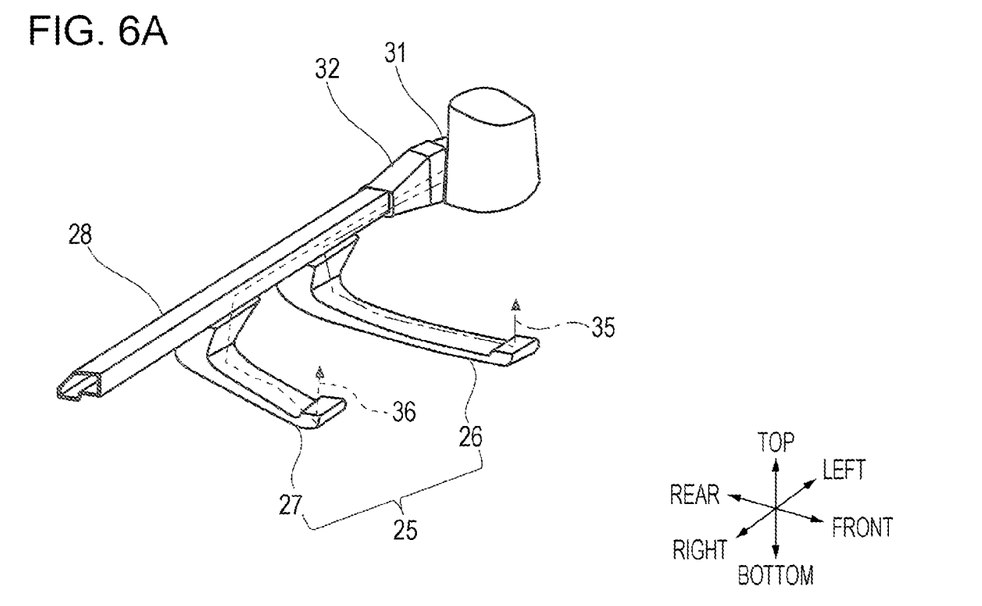
FIG. 6A is a perspective view illustrating the configuration of a communicating duct in the vehicle rear-side structure according to the embodiment.
Figure 6B:
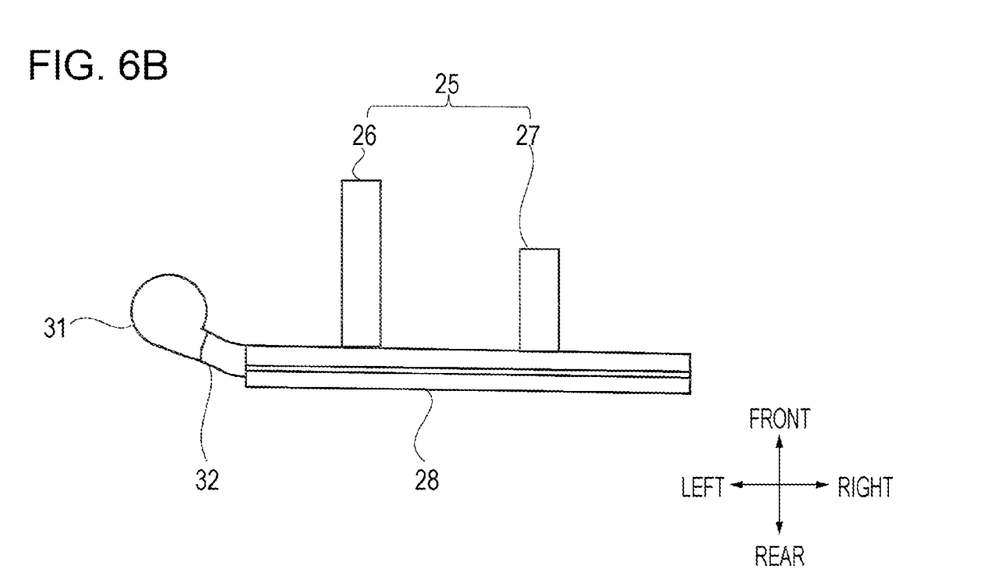
FIG. 6B is a top view illustrating the configuration of the communicating duct in the vehicle rear-side structure according to the embodiment.

FIG. 6A is a perspective view illustrating the configuration of a communicating duct 25 in the vehicle rear-side structure 20. FIG. 6B is a top view illustrating the configuration of the communicating duct 25 seen from a different angle.

As illustrated in FIGS. 6A and 6B, the communicating duct 25 is coupled to the intermediate portion of the rear-end-collision impact reducer 28. The communicating duct 25 causes the rear-end-collision impact reducer 28 and the battery stack 23 (see FIG. 4) to communicate with each other.

The communicating duct 25 includes a first communicating duct 26 and a second communicating duct 27. The rear end of the first communicating duct 26 communicates with the left side of the rear-end-collision impact reducer 28. The front end of the first communicating duct 26 communicates with a battery stack 23 (see FIG. 4) located on the front side. The rear end of the second communicating duct 27 communicates with the right side of the rear-end-collision impact reducer 28. The front end of the second communicating duct 27 communicates with a battery stack 23 (see FIG. 4) located on the rear side.

A first air channel 35 is an air channel formed inside of the inlet duct 32, the rear-end-collision impact reducer 28, and the first communicating duct 26. A second air channel 36 is an air channel formed inside of the inlet duct 32, the rear-end-collision impact reducer 28, and the second communicating duct 27.

The second air channel 36 is longer than the first air channel 35. In the embodiment, the cross-sectional area of the second communicating duct 27 is made larger than that of the first communicating duct 26. This makes a pressure drop of the second communicating duct 27 having a longer air channel smaller, so that the pressure drop of the first communicating duct 26 and that of the second communicating duct 27 become substantially equal to each other. It is thus possible to reduce the temperature difference between a front-side battery stack 23 cooled by air passing through the first air channel 35 and a rear-side battery stack 23 cooled by air passing through the second air channel 36.

The inside of the rear-end-collision impact reducer 28 is formed substantially straight from the left end to the right end without any locally decreased sectional area. This can reduce the pressure drop inside the rear-end-collision impact reducer 28 and make it less likely for a stress to concentrate on a specific portion of the rear-end-collision impact reducer 28.

FIGS. 7A, 7B, 8A, and 8B are side sectional views illustrating a sequential change of the shape of the vehicle rear-side structure 20 due to the occurrence of an override collision with the large vehicle 29.

Figure 7A:
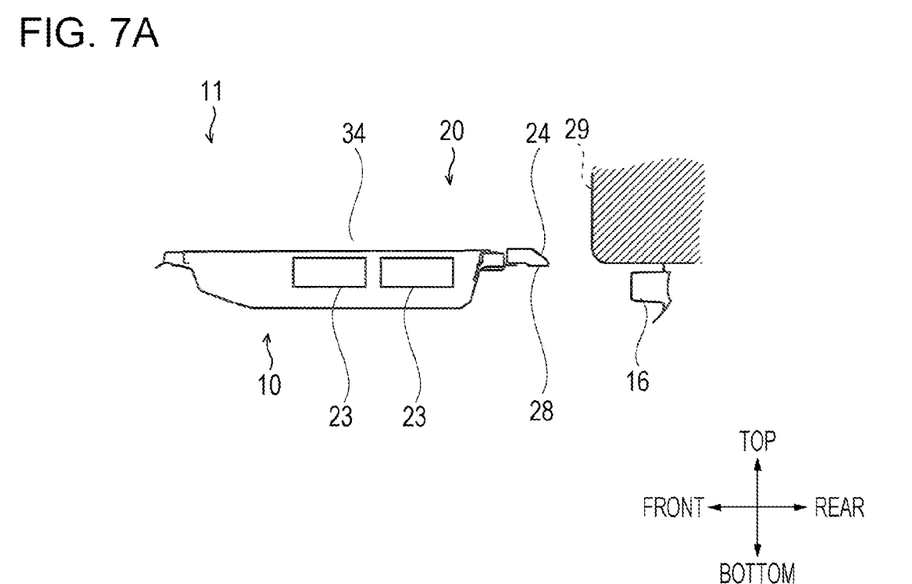
FIGS. 7A, 7B, 8A, and 8B are side sectional views illustrating a sequential change of the shape of the vehicle rear-side structure according to the embodiment.

As illustrated in FIG. 7A, upon the occurrence of an override collision where the large vehicle 29 hits the vehicle 11 from behind, the body of the large vehicle 29 enters the inside of the vehicle 11 from above the rear frame 16.

Figure 7B:
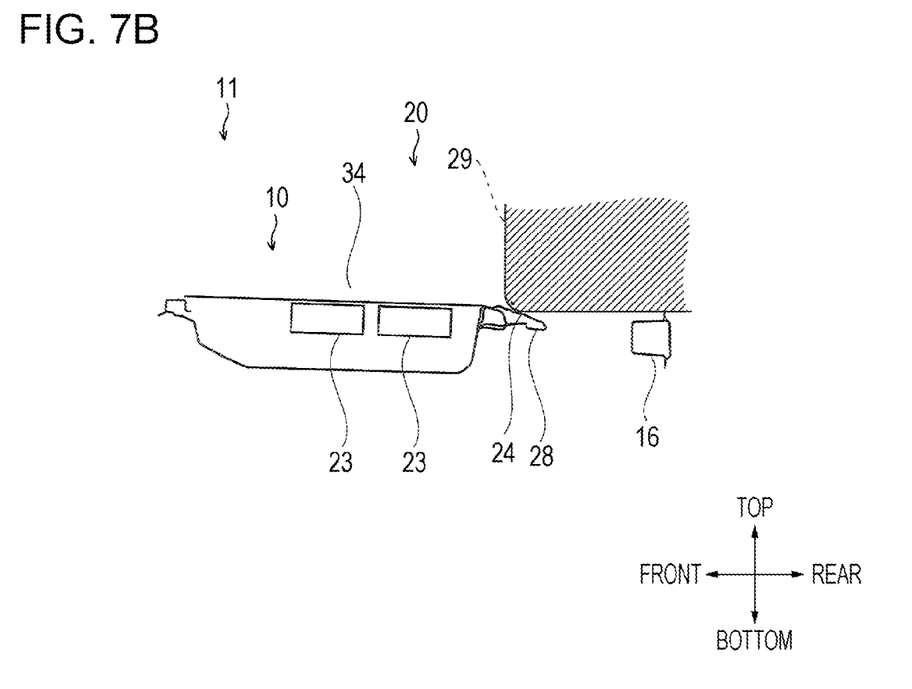

As illustrated in FIG. 7B, when the body of the large vehicle 29 further advances toward the front side, the front bottom end of the large vehicle 29 abuts against the tilt surface 24 of the rear-end-collision impact reducer 28. Then, the impact of the collision is transmitted to the side frames 21 from the rear-end-collision impact reducer 28 and is thus eased.

Figure 8A:
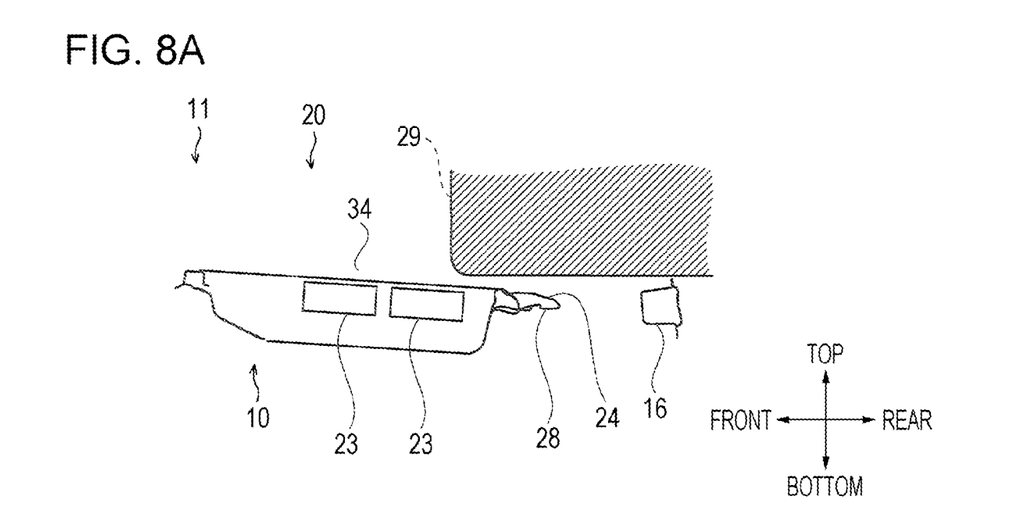

As illustrated in FIG. 8A, the large vehicle 29 further advances to enter the vehicle 11. At this time, the front bottom end of the large vehicle 29 is guided toward the upward direction by the tilt surface 24 of the rear-end-collision impact reducer 28. As a result, the entire bottom side of the vehicle 11 is moved downward and the rear side of the battery pack 10 is also moved downward. It is thus less likely that the impact is directly applied to the battery pack 10.

Figure 8B:
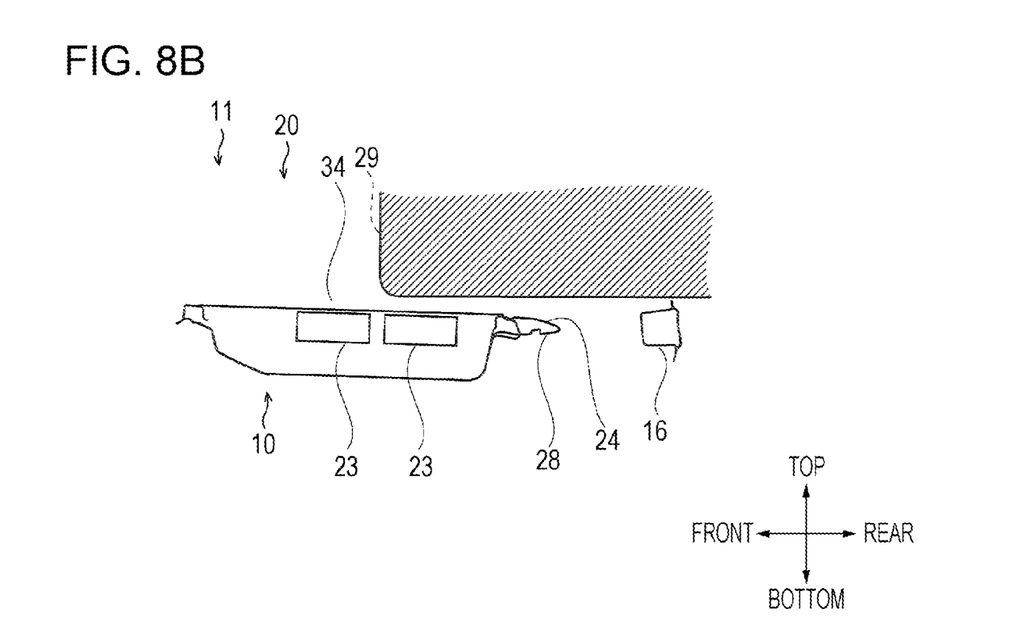

As illustrated in FIG. 8B, the front end of the large vehicle 29 stops over the battery pack 10. Because of the function of the rear-end-collision impact reducer 28, the battery pack 10 is not seriously influenced by the impact of the collision with the large vehicle 29. It is thus less likely that the battery stacks 23 loaded in the battery pack 10 are damaged.

According to the above-described embodiment, the following advantages are achieved.

As illustrated in FIG. 3A, the rear-end-collision impact reducer 28, which is a member for easing the impact of a collision on the battery pack 10, also serves as a member for allowing air for cooling the battery stacks 23 to flow therethrough. This can save the provision of part of a duct for allowing cooling air to flow and thus reduce the number of components around the battery pack 10, thereby simplifying the configuration and reducing the cost.

As illustrated in FIGS. 7A through 8B, in the case of the occurrence of a rear-end collision, the front part of a vehicle having hit the vehicle 11 from behind, such as the large vehicle 29, runs onto the tilt surface 24 of the rear-end-collision impact reducer 28. This can ease the impact of the collision and accordingly protect the battery pack 10 from the impact.

As illustrated in FIG. 3B, both sides of the rear-end-collision impact reducer 28 are bonded to the side frames 21. This can shift the impact of a collision applied to the rear-end-collision impact reducer 28 to the side frames 21.

As illustrated in FIG. 5A, the upper end (surface) of the rear-end-collision impact reducer 28 is located at a higher position than the upper end (surface) of the battery stack 23.

In the case of the occurrence of a rear-side collision, the front part of a vehicle having hit the vehicle 11 from behind, such as the large vehicle 29, runs onto the rear-end-collision impact reducer 28. The impact of the collision on the battery stack 23 can thus be eased.

As illustrated in FIG. 6A, as a result of decreasing the pressure drop of the second communicating duct 27 having a longer air channel, air can be supplied to the plural battery stacks 23 substantially equally.

The disclosure has been described above through illustration of the above-described embodiment. However, the disclosure is not limited to this embodiment. Various modifications can be made without departing from the spirit and scope of the disclosure. The above-described aspects may be combined in a suitable manner.

The invention claimed is:

1. A vehicle rear-side structure configured to ease an impact applied onto a battery pack of a vehicle upon an occurrence of a collision, the vehicle rear-side structure comprising:
   side frames; and
   a rear-end-collision impact reducer,
   wherein the side frames extend in a front-rear direction of the vehicle and are disposed at positions at which the side frames sandwich the battery pack therebetween in a widthwise direction of the vehicle,
   wherein the rear-end-collision impact reducer is disposed between and above the side frames at a rear side of the battery pack, and
   wherein the rear-end-collision impact reducer is configured to allow air, which is to be sent to a battery stack included in the battery pack, to flow through the rear-end-collision impact reducer.

2. The vehicle rear-side structure according to claim 1, wherein the rear-end-collision impact reducer has a tilt surface that is tilted upward toward a front side of the vehicle.

3. The vehicle rear-side structure according to claim 1, wherein both sides of the rear-end-collision impact reducer are bonded to the side frames.

4. The vehicle rear-side structure according to claim 2, wherein both sides of the rear-end-collision impact reducer are bonded to the side frames.

5. The vehicle rear-side structure according to claim 1, wherein an upper end of the rear-end-collision impact reducer is located at a higher position than an upper end of the battery stack.

6. The vehicle rear-side structure according to claim 2, wherein an upper end of the rear-end-collision impact reducer is located at a higher position than an upper end of the battery stack.

7. The vehicle rear-side structure according to claim 3, wherein an upper end of the rear-end-collision impact reducer is located at a higher position than an upper end of the battery stack.

8. The vehicle rear-side structure according to claim 4, wherein an upper end of the rear-end-collision impact reducer is located at a higher position than an upper end of the battery stack.

9. The vehicle rear-side structure according to claim 1, further comprising;
   a communicating duct that allows a communication between the rear-end-collision impact reducer and the battery stack,
   wherein the communicating duct includes a first communicating duct and a second communicating duct having an air channel that is longer than an air channel of the first communicating duct, and
   wherein a cross-sectional area of the second communicating duct is larger than a cross-sectional area of the first communicating duct.

10. The vehicle rear-side structure according to claim 2, further comprising;
    a communicating duct that allows a communication between the rear-end-collision impact reducer and the battery stack,
    wherein the communicating duct includes a first communicating duct and a second communicating duct having an air channel that is longer than an air channel of the first communicating duct, and
    wherein a cross-sectional area of the second communicating duct is larger than a cross-sectional area of the first communicating duct.

11. The vehicle rear-side structure according to claim 3, further comprising;
    a communicating duct that allows a communication between the rear-end-collision impact reducer and the battery stack,
    wherein the communicating duct includes a first communicating duct and a second communicating duct having an air channel that is longer than an air channel of the first communicating duct, and
    wherein a cross-sectional area of the second communicating duct is larger than a cross-sectional area of the first communicating duct.

12. The vehicle rear-side structure according to claim 4, further comprising;
    a communicating duct that allows a communication between the rear-end-collision impact reducer and the battery stack,
    wherein the communicating duct includes a first communicating duct and a second communicating duct having an air channel that is longer than an air channel of the first communicating duct, and
    wherein a cross-sectional area of the second communicating duct is larger than a cross-sectional area of the first communicating duct.

13. The vehicle rear-side structure according to claim 5, further comprising;
    a communicating duct that allows a communication between the rear-end-collision impact reducer and the battery stack,
    wherein the communicating duct includes a first communicating duct and a second communicating duct having an air channel that is longer than an air channel of the first communicating duct, and
    wherein a cross-sectional area of the second communicating duct is larger than a cross-sectional area of the first communicating duct.

14. The vehicle rear-side structure according to claim 6, further comprising;
    a communicating duct that allows a communication between the rear-end-collision impact reducer and the battery stack,
    wherein the communicating duct includes a first communicating duct and a second communicating duct having an air channel that is longer than an air channel of the first communicating duct, and
    wherein a cross-sectional area of the second communicating duct is larger than a cross-sectional area of the first communicating duct.

15. The vehicle rear-side structure according to claim 7, further comprising;

a communicating duct that allows a communication between the rear-end-collision impact reducer and the battery stack, wherein the communicating duct includes a first communicating duct and a second communicating duct having an air channel that is longer than an air channel of the first communicating duct, and wherein a cross-sectional area of the second communicating duct is larger than a cross-sectional area of the first communicating duct.

16. The vehicle rear-side structure according to claim 8, further comprising;

a communicating duct that allows a communication between the rear-end-collision impact reducer and the battery stack, wherein the communicating duct includes a first communicating duct and a second communicating duct having an air channel that is longer than an air channel of the first communicating duct, and wherein a cross-sectional area of the second communicating duct is larger than a cross-sectional area of the first communicating duct.

* * * * *